United States Patent
Croutwater et al.

(10) Patent No.: US 11,704,497 B2
(45) Date of Patent: Jul. 18, 2023

(54) GENERATING AND USING A SENTENCE MODEL FOR ANSWER GENERATION

(71) Applicant: International Business Machines Corporation, Armonk, NY (US)

(72) Inventors: Kyle Croutwater, Chapel Hill, NC (US); Zhe Zhang, Cary, NC (US); Vikrant Verma, Raleigh, NC (US); Le Zhang, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 253 days.

(21) Appl. No.: 17/015,663

(22) Filed: Sep. 9, 2020

(65) Prior Publication Data

US 2022/0075951 A1    Mar. 10, 2022

(51) Int. Cl.
*G06F 40/30*     (2020.01)
*G06F 16/901*    (2019.01)

(52) U.S. Cl.
CPC .......... *G06F 40/30* (2020.01); *G06F 16/9024* (2019.01)

(58) Field of Classification Search
CPC .............................. G06F 40/30; G06F 16/9024
See application file for complete search history.

(56) References Cited

U.S. PATENT DOCUMENTS

| | | | | |
|---|---|---|---|---|
| 2008/0243481 A1* | 10/2008 | Brants | ..................... | G06F 40/44 704/9 |
| 2020/0005503 A1* | 1/2020 | He | .......................... | G06N 3/08 |
| 2020/0097563 A1* | 3/2020 | Alexander | .............. | G06F 16/61 |
| 2020/0311145 A1* | 10/2020 | Li | ...................... | G06F 16/90332 |
| 2020/0401765 A1* | 12/2020 | Ran | ........................ | G06F 40/284 |

(Continued)

FOREIGN PATENT DOCUMENTS

| | | |
|---|---|---|
| CN | 102890723 A | 1/2013 |
| CN | 106776797 A | 5/2017 |
| CN | 107273350 A | 10/2017 |

(Continued)

OTHER PUBLICATIONS

"Funniest Chatbot Fails", Business News Daily, Feb. 13, 2020, 7 pages, <https://www.businessnewsdaily.com/10450-funniest-chatbot-fails.html>.

*Primary Examiner* — Jennifer N Welch
*Assistant Examiner* — Amy P Hoang
(74) *Attorney, Agent, or Firm* — Michael O'Keefe

(57) ABSTRACT

In an approach to generating and using a sentence model for answer generation, one or more computer processors ingest a first corpus of a plurality of text sentences. One or more computer processors convert the plurality of text sentences into a plurality of sentence vectors. One or more computer processors group the plurality of sentence vectors into a plurality of sentence clusters, wherein a sentence cluster is composed of sentences that are semantically similar. One or more computer processors receive a second corpus. One or more computer processors determine, for each sentence cluster of the plurality of sentence clusters, a frequency each sentence cluster appears in the second corpus. Based on the determined frequency, one or more computer processors calculate a probability of each sentence cluster of the plurality of sentence clusters. Based on the calculated probabilities, one or more computer processors generate a first sentence model.

20 Claims, 4 Drawing Sheets

(56) References Cited

U.S. PATENT DOCUMENTS

2021/0342399 A1\* 11/2021 Sisto .................... G06N 3/0454

FOREIGN PATENT DOCUMENTS

| CN | 107704521 | A | 2/2018 |
| CN | 109325040 | A | 2/2019 |
| CN | 110674246 | A | 1/2020 |
| WO | 2017010652 | A1 | 1/2017 |
| WO | 2017186050 | A1 | 11/2017 |

\* cited by examiner

GENERATING AND USING A SENTENCE MODEL FOR ANSWER GENERATION

BACKGROUND OF THE INVENTION

The present invention relates generally to the field of question and answer systems, and more particularly to generating and using a sentence model for answer generation.

Systems such as search engines and question and answer (QA) systems rely on large quantities of information from which the system can draw relationships and build consensus in order to confidently and effectively respond to a query, via natural language processing (NLP), and provide a user with summarized content. The information can come in the form of journal articles, books, news articles, and other knowledge sources.

A statistical language model is a probability distribution over sequences of words. The language model provides context to distinguish between words and phrases that sound similar. Data sparsity is a major problem in building language models. Most possible word sequences are not observed in training. One solution is to make the assumption that the probability of a word only depends on the previous N words. This is known as an N-gram model or unigram model when N equals 1. Estimating the relative likelihood of different phrases is useful in many NLP applications, especially those that generate text as an output. Language modeling is used in speech recognition, machine translation, part-of-speech tagging, parsing, Optical Character Recognition (OCR), handwriting recognition, information retrieval, and other applications.

SUMMARY

Embodiments of the present invention disclose a computer-implemented method, a computer program product, and a system for generating and using a sentence model for answer generation. The method may include one or more computer processors ingesting a first corpus of a plurality of text sentences. One or more computer processors convert the plurality of text sentences into a plurality of sentence vectors. One or more computer processors group the plurality of sentence vectors into a plurality of sentence clusters, wherein a sentence cluster is composed of sentences that are semantically similar. One or more computer processors receive a second corpus. One or more computer processors determine, for each sentence cluster of the plurality of sentence clusters, a frequency each sentence cluster appears in the second corpus. Based on the determined frequency, one or more computer processors calculate a probability of each sentence cluster of the plurality of sentence clusters. Based on the calculated probabilities, one or more computer processors generate a first sentence model.

DETAILED DESCRIPTION

Language models, such as word vector models, are used in information retrieval, such as in a question and answer (QA) system, by counting the frequency of single words in a sentence as unigrams, or two words as bigrams, etc. Often, by focusing on words, a language model in a QA system may choose incorrect or inappropriate answers to questions or provide answers in an unnatural order. Embodiments of the present invention recognize that improvement and efficiency may be gained by extending the concept of a word vector model to generate a sentence model, based on sentence vectors, that can encapsulate semantic relationships between sentences in documents, instead of between individual words, and capture syntactic, discourse, logic, and entailment relationships between sentences. Implementation of embodiments of the invention may take a variety of forms, and exemplary implementation details are discussed subsequently with reference to the Figures.

Figure 1:
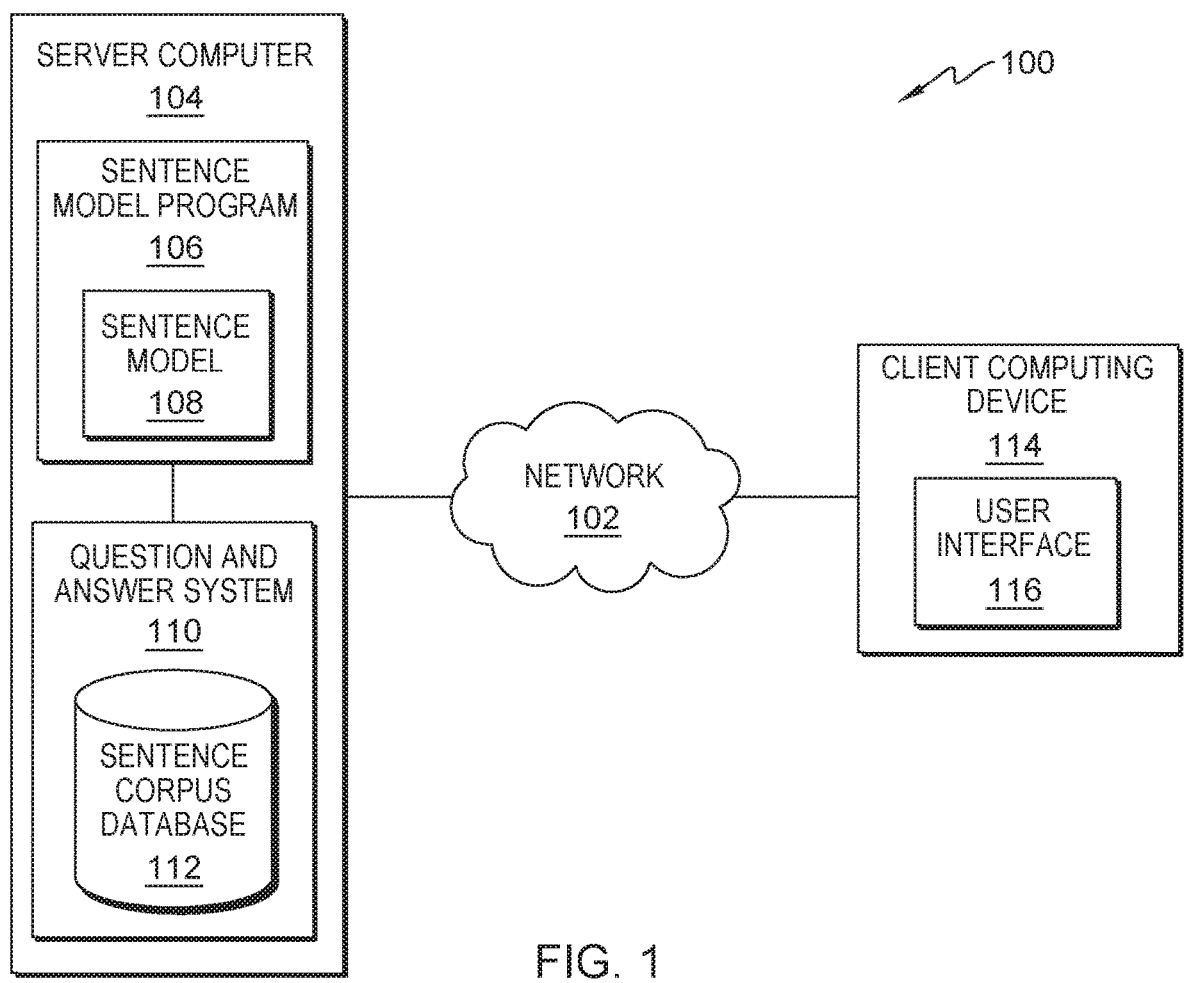
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 104 and client computing device 114, interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks capable of receiving and transmitting data, voice, and/or video signals, including multimedia signals that include voice, data, and video information. In general, network 102 can be any combination of connections and protocols that will support communications between server computer 104, client computing device 114, and other computing devices (not shown) within distributed data processing environment 100.

Server computer 104 can be a standalone computing device, a management server, a web server, a mobile computing device, or any other electronic device or computing system capable of receiving, sending, and processing data. In other embodiments, server computer 104 can represent a server computing system utilizing multiple computers as a server system, such as in a cloud computing environment. In another embodiment, server computer 104 can be a laptop computer, a tablet computer, a netbook computer, a personal computer (PC), a desktop computer, a personal digital assistant (PDA), a smart phone, or any programmable electronic device capable of communicating with client computing device 114 and other computing devices (not shown) within distributed data processing environment 100 via network 102. In another embodiment, server computer 104 represents a computing system utilizing clustered computers and components (e.g., database server computers, application server computers, etc.) that act as a single pool of seamless resources when accessed within distributed data processing environment 100. Server computer 104 includes sentence model program 106 and question and answer system 110. Server computer 104 may include internal and external hardware components, as depicted and described in further detail with respect to FIG. 4.

Sentence model program 106 generates sentence model 108 to provide better answers to questions using sentence vectors. Sentence model 108 automatically learns entailment, generates fewer inappropriate answers, and chooses a natural sentence order from supporting data. In the depicted embodiment, sentence model program 106 is a standalone program that is separate from question and answer system 110. In another embodiment, sentence model program 106 may be integrated as a component of question and answer system 110. Sentence model program 106 ingests a sentence corpus and converts the sentences in the corpus to sentence vectors. Sentence model program 106 groups the sentence vectors into sentence clusters. Sentence model program 106 receives a new corpus and assigns each sentence in the new corpus to a sentence cluster. Based on a pre-determined window size, N, sentence model program 106 determines the frequency each sentence cluster appears. Sentence model program 106 uses the frequency to calculate a probability of a sentence cluster per window size and generates sentence model 108 from the probability. Sentence model program 106 is depicted and described in further detail with respect to FIG. 2 and FIG. 3.

Question and answer (QA) system 110 is one or more of a plurality of QA systems known in the art. QA systems provide automated mechanisms for searching through large sets of sources of content and analyzing them with regard to an input question to determine an answer to the question and a confidence measure as to how accurate an answer is for answering the input question. QA system 110 includes sentence corpus database 112.

Sentence corpus database 112 is a repository for data used by sentence model program 106 and QA system 110. Sentence corpus database 112 can represent one or more databases. In the depicted embodiment sentence corpus database 112 resides on server computer 104. In another embodiment, sentence corpus database 112 may reside elsewhere within distributed data processing environment 100, provided sentence model program 106 and QA system 110 have access to sentence corpus database 112. A database is an organized collection of data. Sentence corpus database 112 can be implemented with any type of storage device capable of storing data and configuration files that can be accessed and utilized by sentence model program 106, such as a database server, a hard disk drive, or a flash memory. Sentence corpus database 112 stores one or more corpora of a plurality of text sentences. In one embodiment, the text sentences come from knowledge sources such as journal articles, books, news articles, etc. Sentence corpus database 112 may also store sentence models, such as sentence model 108, generated by sentence model program 106.

The present invention may contain various accessible data sources, such as sentence corpus database 112, that may include personal data, content, or information the user wishes not to be processed. Personal data includes personally identifying information or sensitive personal information as well as user information, such as tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. Sentence model program 106 enables the authorized and secure processing of personal data. Sentence model program 106 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Sentence model program 106 provides information regarding personal data and the nature (e.g., type, scope, purpose, duration, etc.) of the processing. Sentence model program 106 provides the user with copies of stored personal data. Sentence model program 106 allows the correction or completion of incorrect or incomplete personal data. Sentence model program 106 allows the immediate deletion of personal data.

Client computing device 114 can be one or more of a laptop computer, a tablet computer, a smart phone, a smart watch, a smart speaker, or any programmable electronic device capable of communicating with various components and devices within distributed data processing environment 100, via network 102. Client computing device 114 may be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In one embodiment, the wearable computer may be in the form of a head mounted display. The head mounted display may take the form-factor of a pair of glasses. In an embodiment, the wearable computer may be in the form of a smart watch or a smart tattoo. In an embodiment, client computing device 114 may be integrated into a vehicle of the user. For example, client computing device 114 may include a heads-up display in the windshield of the vehicle. In general, client computing device 114 represents one or more programmable electronic devices or combination of programmable electronic devices capable of executing machine readable program instructions and communicating with other computing devices (not shown) within distributed data processing environment 100 via a network, such as network 102. Client computing device 114 includes an instance of user interface 116.

User interface 116 provides an interface between sentence model program 106 and QA system 110 on server computer 104 and a user of client computing device 114. In one embodiment, user interface 116 is mobile application software. Mobile application software, or an "app," is a computer program designed to run on smart phones, tablet computers and other mobile devices. In one embodiment, user interface 116 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 116 enables a user of client computing device 114 to input questions to QA system 110 and to receive answers from QA system 110. User interface 116 may also enable the user of client computing device 114 to interact with sentence model program 106, such as to define various criteria to use in sentence model generation.

Figure 2:
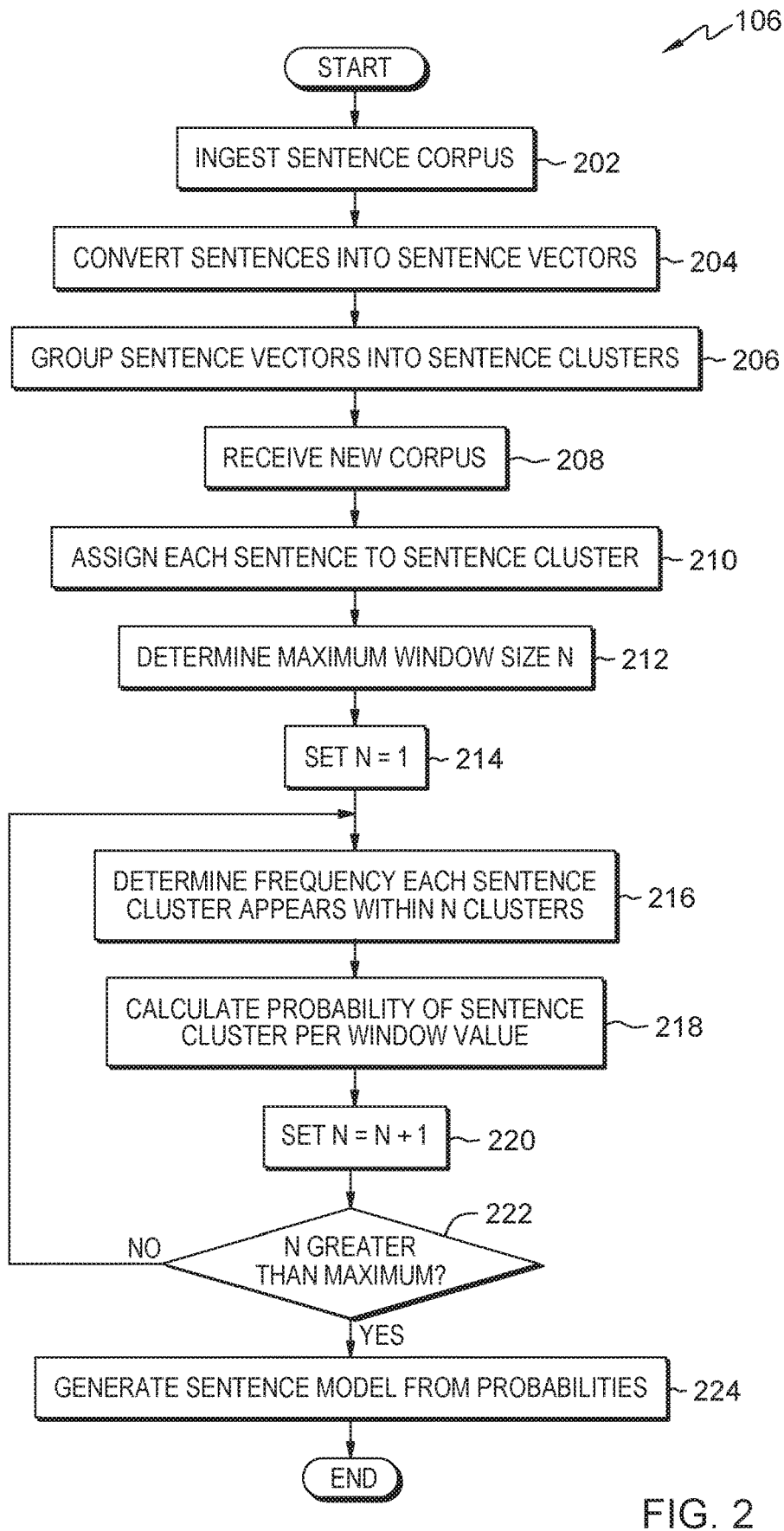
FIG. 2 is a flowchart depicting operational steps of a sentence model program, on a server computer within the distributed data processing environment of FIG. 1, for generating a sentence model, in accordance with an embodiment of the present invention.

FIG. 2 is a flowchart depicting operational steps of sentence model program 106, on server computer 104 within distributed data processing environment 100 of FIG. 1, for generating sentence model 108, in accordance with an embodiment of the present invention.

Sentence model program 106 ingests a sentence corpus (step 202). In an embodiment, sentence model program 106 ingests a large input corpus, or body of works, that may consist of a plurality of documents from different sources. In one embodiment, the corpus is provided by a user of client computing device 114, via user interface 116. In another embodiment, the corpus is provided by a third party. In an embodiment, the corpus is stored in sentence corpus database 112.

Sentence model program 106 converts the sentences into sentence vectors (step 204). As would be appreciated by one skilled in the art, a sentence vector is a numerical coordinate representation of a sentence in an x-y plane, i.e., a 2-dimensional plane of sentence vectors. Sentences with similar meanings have similar locations in the x-y plane, i.e., similar coordinates. Sentence model program 106 converts each sentence of the plurality of text sentences in the corpus into a sentence vector. In an embodiment, sentence model program 106 plots the sentence vectors on a two-dimensional graph. In an embodiment, sentence model program 106 uses one or more natural language processing (NLP) techniques to determine the meaning of the sentences in order to convert the sentences into sentence vectors.

Sentence model program 106 groups sentence vectors into sentence clusters (step 206). In an embodiment, sentence model program 106 groups sentence vectors that are within a spatial threshold into sentence clusters composed of sentences that semantically mean the same thing, i.e., are semantically similar. In an embodiment, the spatial threshold is a radius of a circle in the x-y plane of sentence vectors. Sentence model program 106 may increase or decrease the value of the radius to generate a threshold measurement of similarity between the sentence vectors in the cluster. Sentence model program 106 clusters the sentence vectors in order to reduce the vocabulary size, i.e., the total number of different sentences in the corpus to a tractable number.

Sentence model program 106 receives a new corpus (step 208). In an embodiment, sentence model program 106 receives a new corpus as training data for answering questions. In one embodiment, sentence model program 106 retrieves the new corpus from sentence corpus database 112.

Sentence model program 106 assigns each sentence to a sentence cluster (step 210). In an embodiment, sentence model program 106 assigns each sentence of the new corpus to a previously generated sentence cluster based on the meaning of the sentence, i.e., based on its sentence vector. In an embodiment, sentence model program 106 uses one or more NLP techniques to determine the meaning of each sentence in order to assign the sentence to the appropriate sentence cluster.

Sentence model program 106 determines a maximum window value N (step 212). As would be recognized by a person of skill in the art, with respect to a language model, the window value is the number of dimensions of similarity to be measured between words. For example, if N equals 1, then the model determines how likely it is for a single word to appear in the corpus, i.e., a unigram. If N equals 2, then the model determines how likely it is that a second word appears in the corpus if the first word is in the corpus, and so on. In an embodiment of this invention, sentence model program 106 extends the language model to a sentence model and determines the maximum window value N with respect to sentences. In one embodiment, sentence model program 106 determines the maximum window value based on learning an optimum value over time via cognitive analytics. In another embodiment, a user determines the maximum window value and feeds the value to sentence model program 106 via user interface 116. As would be recognized by a person of skill in the art, window values are positive integers, and a typical maximum window value is N equals 5.

Sentence model program 106 sets N to equal 1 (step 214). In an embodiment, sentence model program 106 sets up a counter in order to loop through continuous values of N, starting with 1 and proceeding until the value is greater than the determined maximum value.

Sentence model program 106 determines a frequency that each sentence cluster appears within N clusters (step 216). In an embodiment, sentence model program 106 counts how frequently each sentence cluster occurs within N sentence clusters away. For example, in the embodiment where N equals 1, sentence model program 106 determines the frequency each sentence cluster occurs in the new corpus. In another example, in an embodiment where N equals 2, sentence model program 106 determines the frequency that each sentence cluster is within another sentence cluster, i.e., the number of times a second sentence cluster is associated with the first sentence cluster. For example, if the first sentence cluster is around the sentence "I like hamburgers," and the second sentence cluster is around the sentence "I eat fries with a hamburger," then sentence model program 106 determines the frequency that the second sentence cluster appears within one cluster of the first sentence cluster.

Sentence model program 106 calculates a probability of each sentence cluster per window value (step 218). In an embodiment, sentence model program 106 divides the frequency of each cluster with the total number of sentence clusters in the new corpus to determine a probability associated with that cluster for the window value N. For example, if the total number of sentence clusters in the new corpus is 8000, and sentence model program 106 determines the frequency of a cluster for N equals 1 is 200, then the probability of the sentence cluster is 0.025. Sentence model program 106 repeats the calculation for each sentence cluster for the current window value of N.

Sentence model program 106 sets N to equal N plus 1 (step 220). As discussed with respect to step 214, sentence model program 106 increases the counter by increments of 1 in order to determine cluster frequencies at different dimensions of similarity.

Sentence model program 106 determines if N is greater than the maximum value of N (decision block 222). If sentence model program 106 determines N is not greater than the maximum value of N ("no" branch, decision block 222), then sentence model program 106 returns to step 216 to process the next window value.

If sentence model program 106 determines N is greater than the maximum value of N ("yes" branch, decision block 222), then sentence model program 106 generates sentence model 108 from the calculated probabilities (step 224). In an embodiment, based on the calculated probabilities for each sentence cluster for each window value N, sentence model program 106 generates sentence model 108. Sentence model 108 includes the probabilities for all of the sentences in the new corpus for each window value of N. For example, sentence model 108 uses the probabilities in answer generation when choosing supporting sentences and their order. In an embodiment, sentence model program 106 stores sentence model 108 in sentence corpus database 112.

Figure 3:
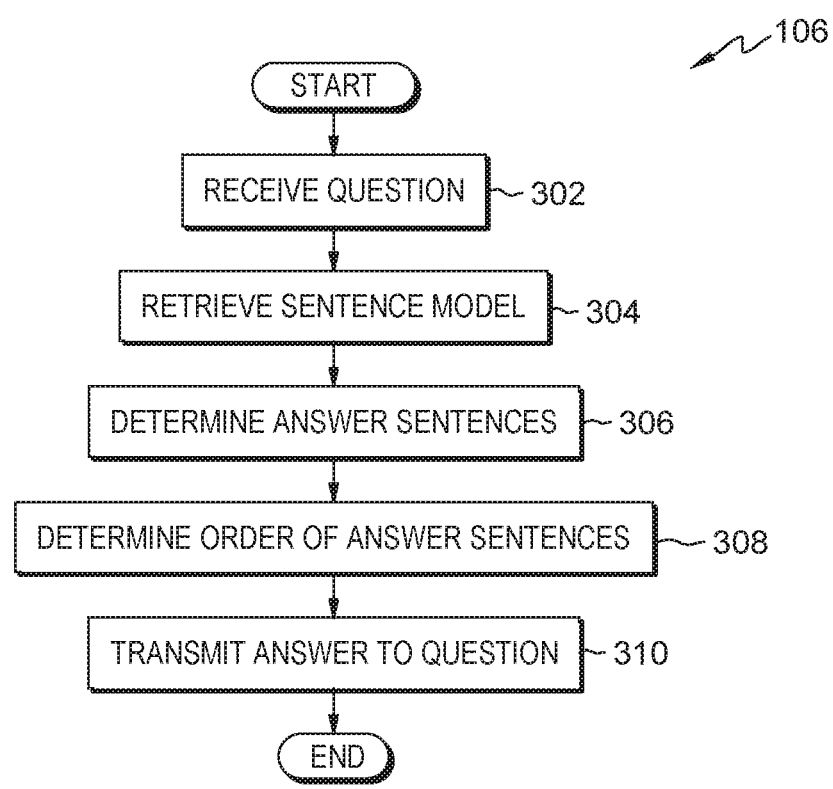
FIG. 3 is a flowchart depicting operational steps of the sentence model program, on the server computer within the distributed data processing environment of FIG. 1, for using the sentence model, in accordance with an embodiment of the present invention.

FIG. 3 is a flowchart depicting operational steps of sentence model program 106, on server computer 104 within distributed data processing environment 100 of FIG. 1, for using sentence model 108, in accordance with an embodiment of the present invention.

Sentence model program 106 receives a question (step 302). In an embodiment, when a user of client computing device 114 transmits a question, via user interface 116, to QA system 110, sentence model program 106 receives the question. In another embodiment, sentence model program 106 may receive the question directly from the user of client computing device 114, via user interface 116.

Sentence model program 106 retrieves a sentence model (step 304). In an embodiment, sentence model program 106 retrieves a sentence model, such as sentence model 108. In an embodiment where sentence model 108 is a component of sentence model program 106, sentence model program may not retrieve sentence model 108. In one embodiment, sentence model program 106 may retrieve another sentence model from sentence corpus database 112. In one embodiment, sentence model program 106 receives sentence model 108 from a user of client computing device 114.

Sentence model program 106 determines answer sentences (step 306). In an embodiment, sentence model program 106 applies the retrieved sentence model to the corpus to find the sentences within sentence clusters with the highest probabilities. Sentence model program 106 captures a discourse relationship between sentences by providing a relevant set of sentences for an answer. Sentence model program 106 may also capture entailment relationships between sentences, i.e., not presenting a second sentence that cannot be true if following a particular first sentence. For example, sentence model program 106 may not choose the sentence "It's been raining for three days" to follow the sentence "The area is in a severe drought."

Sentence model program 106 determines order of answer sentences (step 308). In an embodiment, sentence model program 106 determines the highest probabilities for each sentence cluster for a window value of N greater than 1 in order to determine the probability of sentences coming before or after other sentences. Sentence model program 106 chooses the sentences in order of probability, thus capturing the syntactic relationship between sentences to create a logical order. Continuing the example from FIG. 2, sentence model program 106 may determine there is a higher probability that the sentence "I eat fries with a hamburger" follows the sentence "I like hamburgers" than the opposite order.

Sentence model program 106 transmits answer to question (step 310). In an embodiment, sentence model program 106 transmits the answer to the question, with multiple sentences in the determined order to the user of client computing device 114 via user interface 116. In another embodiment, sentence model program 106 transmits the answer to QA system 110, and QA system 110 transmits the answer via user interface 116.

Figure 4:
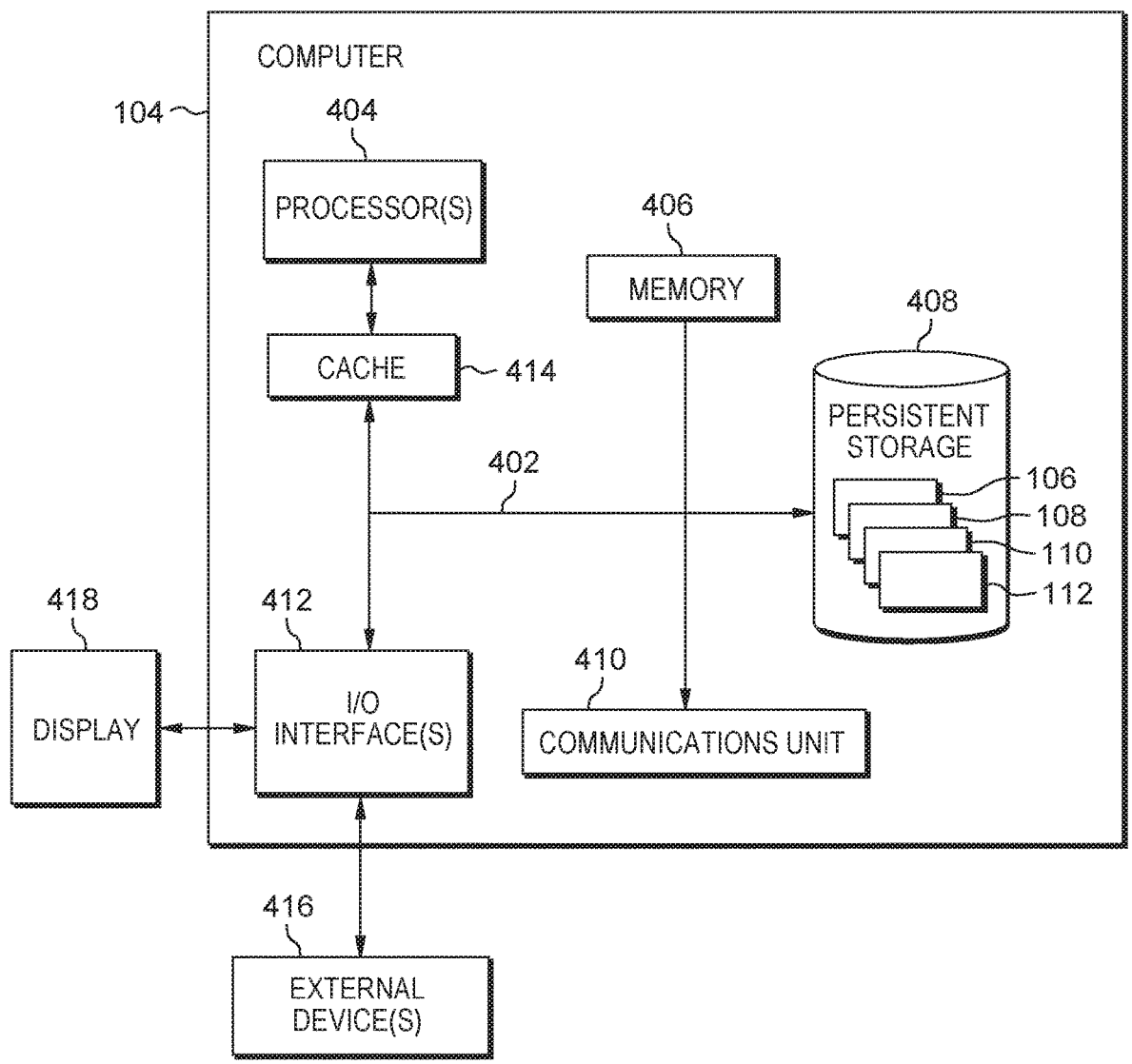
FIG. 4 depicts a block diagram of components of the server computer executing the sentence model program within the distributed data processing environment of FIG. 1, in accordance with an embodiment of the present invention.

FIG. 4 depicts a block diagram of components of server computer 104 within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Server computer 104 can include processor(s) 404, cache 414, memory 406, persistent storage 408, communications unit 410, input/output (I/O) interface(s) 412 and communications fabric 402. Communications fabric 402 provides communications between cache 414, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of processor(s) 404 by holding recently accessed data, and data near recently accessed data, from memory 406.

Program instructions and data used to practice embodiments of the present invention, e.g., sentence model program 106, sentence model 108, QA system 110, and sentence corpus database 112, are stored in persistent storage 408 for execution and/or access by one or more of the respective processor(s) 404 of server computer 104 via cache 414. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of client computing device 114. In these examples, communications unit 410 includes one or more network interface cards. Communications unit 410 may provide communications through the use of either or both physical and wireless communications links. Sentence model program 106, sentence model 108, QA system 110, sentence corpus database 112, and other programs and data used for implementation of the present invention, may be downloaded to persistent storage 408 of server computer 104 through communications unit 410.

I/O interface(s) 412 allows for input and output of data with other devices that may be connected to server computer 104. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media such as, for example, thumb drives, portable optical or magnetic disks, and memory cards. Software and data used to practice embodiments of the present invention, e.g., sentence model program 106, sentence model 108, QA system 110, and sentence corpus database 112 on server computer 104, can be stored on such portable computer readable storage media and can be loaded onto persistent storage 408 via I/O interface(s) 412. I/O interface(s) 412 also connect to display 418.

Display 418 provides a mechanism to display data to a user and may be, for example, a computer monitor. Display 418 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   ingesting, by one or more computer processors, a first corpus of a plurality of text sentences;
   converting, by one or more computer processors, the plurality of text sentences into a plurality of sentence vectors, wherein a sentence vector is a numerical coordinate representation of a sentence in an x-y plane;
   grouping, by one or more computer processors, the plurality of sentence vectors into a plurality of sentence clusters, wherein a sentence cluster is composed of sentence vectors that are semantically similar;
   receiving, by one or more computer processors, a second corpus of a plurality of text sentences;
   determining, by one or more computer processors, a meaning of each sentence of the second corpus;
   based on the determined meaning, assigning, by one or more computer processors, each sentence of the second corpus to a sentence cluster of the plurality of sentence clusters;
   determining, by one or more computer processors, for each sentence cluster of the plurality of sentence clusters, a frequency each sentence cluster appears in the second corpus;
   based on the determined frequency, calculating, by one or more computer processors, a probability associated with each sentence cluster that appears in the second corpus, wherein the probability is a total number of sentence clusters in the second corpus divided by the determined frequency; and
   based on the calculated probabilities, generating, by one or more computer processors, a first sentence model.

2. The computer-implemented method of claim 1, further comprising:
   determining, by one or more computer processors, one or more window values of N for which similarity between the plurality of text sentences is to be measured, wherein N corresponds to one or more N-grams, wherein an N-gram represents a likelihood that a first text sentence appears in the second corpus with respect to N other sentences, and wherein the one or more window values of N are positive integers;
   determining, by one or more computer processors, for each sentence cluster of the plurality of sentence clusters, a frequency each sentence cluster appears in the second corpus for each of the one or more window values of N;
   based on the determined frequency, calculating, by one or more computer processors, a probability of each sentence cluster of the plurality of sentence clusters for each of the one or more window values of N; and
   based on the calculated probabilities, generating, by one or more computer processors, a second sentence model, wherein the second sentence model includes the probabilities for the plurality of text sentences for each of the one or more window values of N.

3. The computer-implemented method of claim 1, further comprising:
   plotting, by one or more computer processors, the plurality of sentence vectors on a two-dimensional graph.

4. The computer-implemented method of claim 1, further comprising:
   receiving, by one or more computer processors, a question;
   retrieving, by one or more computer processors, the first sentence model;
   based on the first sentence model, determining, by one or more computer processors, one or more sentences from the second corpus as an answer to the question; and
   transmitting, by one or more computer processors, the answer to the question.

5. The computer-implemented method of claim 4, further comprising:
   based on the first sentence model, determining, by one or more computer processors, an order of the one or more sentences in the answer.

6. The computer-implemented method of claim 4, wherein the first sentence model captures at least one relationship between each of the one or more sentences in the answer, wherein the relationship includes at least one of semantic, syntactic, discourse, logic, and entailment.

7. The computer-implemented method of claim 1, wherein grouping the plurality of sentence vectors into the plurality of sentence clusters further comprises:
   grouping, by one or more computer processors, the plurality of sentence vectors within a spatial threshold, wherein the spatial threshold is a radius of a circle in a 2-dimensional plane of sentence vectors.

8. A computer program product comprising:
   one or more computer readable storage media and program instructions collectively stored on the one or more computer readable storage media, the stored program instructions comprising:
   program instructions to ingest a first corpus of a plurality of text sentences;
   program instructions to convert the plurality of text sentences into a plurality of sentence vectors, wherein a sentence vector is a numerical coordinate representation of a sentence in an x-y plane;
   program instructions to group the plurality of sentence vectors into a plurality of sentence clusters, wherein a sentence cluster is composed of sentence vectors that are semantically similar;
   program instructions to receive a second corpus of a plurality of text sentences;
   program instructions to determine a meaning of each sentence of the second corpus;

based on the determined meaning, program instructions to assign each sentence of the second corpus to a sentence cluster of the plurality of sentence clusters;

program instructions to determine, for each sentence cluster of the plurality of sentence clusters, a frequency each sentence cluster appears in the second corpus;

based on the determined frequency, program instructions to calculate a probability associated with each sentence cluster that appears in the second corpus, wherein the probability is a total number of sentence clusters in the second corpus divided by the determined frequency; and based on the calculated probabilities, program instructions to generate a first sentence model.

9. The computer program product of claim 8, the stored program instructions further comprising:

program instructions to determine one or more window values of N for which similarity between the plurality of text sentences is to be measured, wherein N corresponds to one or more N-grams, wherein an N-gram represents a likelihood that a first text sentence appears in the second corpus with respect to N other sentences, and wherein the one or more window values of N are positive integers;

program instructions to determine, for each sentence cluster of the plurality of sentence clusters, a frequency each sentence cluster appears in the second corpus for each of the one or more window values of N;

based on the determined frequency, program instructions to calculate a probability of each sentence cluster of the plurality of sentence clusters for each of the one or more window values of N; and based on the calculated probabilities, program instructions to generate a second sentence model, wherein the second sentence model includes the probabilities for the plurality of text sentences for each of the one or more window values of N.

10. The computer program product of claim 8, the stored program instructions further comprising:

program instructions to plot the plurality of sentence vectors on a two-dimensional graph.

11. The computer program product of claim 8, the stored program instructions further comprising:

program instructions to receive a question;
program instructions to retrieve the first sentence model;
based on the first sentence model, program instructions to determine one or more sentences from the second corpus as an answer to the question; and
program instructions to transmit the answer to the question.

12. The computer program product of claim 11, the stored program instructions further comprising:

based on the first sentence model, program instructions to determine an order of the one or more sentences in the answer.

13. The computer program product of claim 11, wherein the first sentence model captures at least one relationship between each of the one or more sentences in the answer, wherein the relationship includes at least one of semantic, syntactic, discourse, logic, and entailment.

14. The computer program product of claim 8, wherein the program instructions to group the plurality of sentence vectors into the plurality of sentence clusters comprise:

program instructions to group the plurality of sentence vectors within a spatial threshold, wherein the spatial threshold is a radius of a circle in a 2-dimensional plane of sentence vectors.

15. A computer system comprising:
one or more computer processors;
one or more computer readable storage media;
program instructions collectively stored on the one or more computer readable storage media for execution by at least one of the one or more computer processors, the stored program instructions comprising:
program instructions to ingest a first corpus of a plurality of text sentences;
program instructions to convert the plurality of text sentences into a plurality of sentence vectors, wherein a sentence vector is a numerical coordinate representation of a sentence in an x-y plane;
program instructions to group the plurality of sentence vectors into a plurality of sentence clusters, wherein a sentence cluster is composed of sentence vectors that are semantically similar;
program instructions to receive a second corpus of a plurality of text sentences;
program instructions to determine a meaning of each sentence of the second corpus;
based on the determined meaning, program instructions to assign each sentence of the second corpus to a sentence cluster of the plurality of sentence clusters;
program instructions to determine, for each sentence cluster of the plurality of sentence clusters, a frequency each sentence cluster appears in the second corpus;
based on the determined frequency, program instructions to calculate a probability associated with each sentence cluster that appears in the second corpus, wherein the probability is a total number of sentence clusters in the second corpus divided by the determined frequency; and
based on the calculated probabilities, program instructions to generate a first sentence model.

16. The computer system of claim 15, the stored program instructions further comprising:
program instructions to receive a question;
program instructions to retrieve the first sentence model;
based on the first sentence model, program instructions to determine one or more sentences from the second corpus as an answer to the question; and
program instructions to transmit the answer to the question.

17. The computer system of claim 16, the stored program instructions further comprising:
based on the first sentence model, program instructions to determine an order of the one or more sentences in the answer.

18. The computer system of claim 16, wherein the first sentence model captures at least one relationship between each of the one or more sentences in the answer, wherein the relationship includes at least one of semantic, syntactic, discourse, logic, and entailment.

19. The computer system of claim 15, wherein the program instructions to group the plurality of sentence vectors into the plurality of sentence clusters comprise:
program instructions to group the plurality of sentence vectors within a spatial threshold, wherein the spatial threshold is a radius of a circle in a 2-dimensional plane of sentence vectors.

20. The computer system of claim 15, further comprising:
setting, by one or more computer processors, an initial value of N to one, wherein N corresponds to one or more N-grams, wherein an N-gram represents a likelihood that a first text sentence appears in the second corpus with respect to N other sentences in the second corpus;

determining, by one or more computer processors, a maximum value of N;

continuously incrementing, by one or more computer processors, a value of N from the initial value of N to the maximum value of N, wherein each value of N is a positive integer;

determining, by one or more computer processors, for each sentence cluster of the plurality of sentence clusters, a frequency each sentence cluster appears in the second corpus within N clusters away for each value of N;

based on the determined frequency, calculating, by one or more computer processors, a probability of each sentence cluster for each value of N; and based on the calculated probabilities, generating, by one or more computer processors, a second sentence model, wherein the second sentence model includes the probabilities for each of the text sentences in the second corpus for each value of N.

* * * * *